United States Patent
Song

(10) Patent No.: US 10,761,389 B2
(45) Date of Patent: Sep. 1, 2020

(54) PIXEL ARRANGEMENT AND DISPLAY PANEL

(71) Applicants: CHONGQING HKC OPTOELECTRONICS TECHNOLOGY CO., LTD., Chongqing (CN); HKC CORPORATION LIMITED, Shenzhen, Guangdong (CN)

(72) Inventor: Zhenli Song, Guangdong (CN)

(73) Assignees: CHONGQING HKC OPTOELECTRONICS TECHNOLOGY CO., LTD., Chongqing (CN); HKC CORPORATION LIMITED, Shenzhen (CN)

(*) Notice: Subject to any disclaimer, the term of this patent is extended or adjusted under 35 U.S.C. 154(b) by 0 days.

(21) Appl. No.: 16/314,036

(22) PCT Filed: Nov. 28, 2018

(86) PCT No.: PCT/CN2018/117944
§ 371 (c)(1),
(2) Date: Dec. 28, 2018

(87) PCT Pub. No.: WO2020/052094
PCT Pub. Date: Mar. 19, 2020

(65) Prior Publication Data
US 2020/0089067 A1     Mar. 19, 2020

(30) Foreign Application Priority Data
Sep. 14, 2018 (CN) .......................... 2018 1 1076330

(51) Int. Cl.
*G02F 1/1362* (2006.01)
*G09G 3/36* (2006.01)

(52) U.S. Cl.
CPC .... *G02F 1/136286* (2013.01); *G02F 2201/52* (2013.01); *G09G 3/3607* (2013.01);
(Continued)

(58) Field of Classification Search
CPC  G02F 2201/52; G09G 3/3607; G09G 3/3614; G09G 2300/0452;
(Continued)

(56) References Cited

U.S. PATENT DOCUMENTS

2014/0125644 A1\* 5/2014 Guo .................... G09G 3/3648
345/209
2015/0356928 A1\* 12/2015 Xie ..................... G09G 3/3225
345/694

(Continued)

*Primary Examiner* — Nelson M Rosario

(57) ABSTRACT

This application provides a pixel arrangement and a display panel. The pixel arrangement includes a plurality of pixel cells arranged in an array, each pixel cell includes four sub-pixels that are respectively red, green, blue, and white. Sub-pixels in a same row are connected to a same scanning line, and sub-pixels in a same column are connected to a same data line. In the pixel arrangement, sub-pixels connected to eight sequential data lines are arranged as a repetition group, and a data signal on an $N^{th}$ data line is the same as a data signal on an $(N+1)^{th}$ data line. In one repetition group, polarities of data signals of sub-pixels with a same color that are connected to a same scanning line are opposite.

15 Claims, 7 Drawing Sheets

(52) U.S. Cl.
CPC ... *G09G 3/3614* (2013.01); *G09G 2300/0452* (2013.01); *G09G 2320/0209* (2013.01); *G09G 2320/0242* (2013.01); *G09G 2320/0247* (2013.01)

(58) Field of Classification Search
CPC ... G09G 2320/0209; G09G 2320/0242; G09G 2320/0247
See application file for complete search history.

(56) References Cited

U.S. PATENT DOCUMENTS

2016/0314736 A1* 10/2016 Sang .................... G09G 3/3607
2019/0051670 A1*  2/2019 Bei ....................... H01L 27/124

* cited by examiner

PIXEL ARRANGEMENT AND DISPLAY PANEL

This application claims priority to Chinese Patent Application No. 201811076330.3, filed with the Chinese Patent Office on Sep. 14, 2018 and entitled "PIXEL ARRANGEMENT AND DISPLAY PANEL", which is incorporated herein by reference in its entirety.

BACKGROUND

Technical Field

This application relates to the field of display technologies, and more particularly to a pixel arrangement and a display panel.

Related Art

In a color liquid crystal display screen, one display unit (or referred to as a pixel) generally includes three sub-pixels: red (R), green (G), and blue (B). To improve the penetration rate of the liquid crystal display screen, an original structure including three sub-pixels may be changed into a structure including four sub-pixels: R, G, B, and W (white). An arrangement structure of the sub-pixels R, G, B, and W is generally sequential arrangement in a transverse direction (a direction of a scanning line), and each row of pixels has a same arrangement manner. Polarities of drive signals on a data line are +, −, +, −, +, −, . . . . A drive signal Data n on a data line is equal to Data (n+4), that is, a data signal on the $1^{st}$ data line is consistent with a data signal on the $5^{th}$ data line. When a same polarity is lit up, only R and B are lit up, and a flicker image is generated. When a pure-color image is lit up, lit-up sub-pixels have a same polarity. Therefore, a voltage of a common electrode is easily pulled up or pulled down, affecting the pixel and resulting in a phenomenon such as flicker, color cast, or cross-talk. For example, when an R pure-color image is lit up, polarities of R sub-pixels are all positive. Consequently, the voltage of the common electrode is easily pulled up, causing sever cross-talk and flicker. When a G pure-color image is lit up, polarities of G sub-pixels are all negative. Consequently, the voltage of the common electrode is easily pulled down, also affecting the whole pixel and causing poor display effects.

SUMMARY

An objective of this application is to provide a pixel arrangement, to achieve objectives of, including but not limited to, inhibiting phenomena of flicker, color cast, and cross-talk, and improving display effects.

A technical solution used in an embodiment of this application is: a pixel arrangement, including:

a plurality of pixel cells arranged in an array, where each pixel cell includes four sub-pixels that are respectively a red sub-pixel, a green sub-pixel, a blue sub-pixel, and a white sub-pixel;

a plurality of scanning lines, where sub-pixels in a same row are connected to a same scanning line; and a plurality of data lines, where sub-pixels in a same column are connected to a same data line, where in the pixel arrangement, sub-pixels connected to eight sequential data lines are arranged as a repetition group, where a polarity of a data signal of an $N^{th}$ data line is the same as a polarity of a data signal of an $(N+8)^{th}$ data line, N is an integer greater than zero, and in one repetition group, polarities of data signals of sub-pixels with a same color that are connected to a same scanning line are opposite.

In an embodiment, polarities of data signals of a plurality of sub-pixels corresponding to a same data line are the same, and polarities of data signals on neighboring data lines are opposite.

In an embodiment, sub-pixels corresponding to each scanning line have a same arrangement structure, and the sub-pixels corresponding to the same data line have a same color.

In an embodiment, an arrangement manner of the sub-pixels corresponding to each scanning line is red, green, blue, white, green, red, white, and blue.

In an embodiment, an arrangement manner of the sub-pixels corresponding to each scanning line is red, green, blue, white, white, red, green, and blue.

In an embodiment, an arrangement manner of the sub-pixels corresponding to each scanning line is red, green, blue, white, green, blue, white, and red.

In an embodiment, an arrangement manner of the sub-pixels corresponding to each scanning line is red, green, blue, white, white, blue, green, and red.

In an embodiment, an arrangement structure of sub-pixels corresponding to an $N^{th}$ scanning line is the same as an arrangement structure of sub-pixels corresponding to an $(N+2)^{th}$ scanning line, and sub-pixels corresponding to a same data line have a same color at intervals of one sub-pixel.

In an embodiment, an arrangement manner of the sub-pixels corresponding to the $N^{th}$ scanning line is red, green, blue, white, green, red, white, and blue, and an arrangement manner of sub-pixels corresponding to an $(N+1)^{th}$ scanning line is white, blue, red, green, blue, white, green, and red.

In an embodiment, polarities of data signals of a plurality of sub-pixels corresponding to the same data line are the same, and polarities of data signals on neighboring data lines are opposite.

In an embodiment, polarities of data signals of two neighboring sub-pixels corresponding to a same scanning line are opposite, and polarities of data signals of two neighboring sub-pixels with a same color that correspond to the same data line are opposite.

Another objective of this application is to provide a display panel, including:

a pixel arrangement, where the pixel arrangement includes:

a plurality of pixel cells arranged in an array, where each pixel cell includes four sub-pixels that are respectively a red sub-pixel, a green sub-pixel, a blue sub-pixel, and a white sub-pixel;

a plurality of scanning lines, where sub-pixels in a same row are connected to a same scanning line; and a plurality of data lines, where sub-pixels in a same column are connected to a same data line, where in the pixel arrangement, sub-pixels connected to eight sequential data lines are arranged as a repetition group, where a polarity of a data signal of an $N^{th}$ data line is the same as a polarity of a data signal of an $(N+8))^{th}$ data line, N is an integer greater than zero, and in one repetition group, polarities of data signals of sub-pixels with a same color that are connected to a same scanning line are opposite.

In an embodiment, the display panel further includes a first substrate layer, a metal conductor layer, an array switch layer, a pixel electrode layer, an optical conducting layer, a common electrode layer, and a second substrate layer that are sequentially disposed and a color photoresist layer disposed between the first substrate layer and the second substrate layer, and the pixel arrangement includes at least the array switch layer, the metal conductor layer, the pixel electrode layer, the optical conducting layer, the common electrode layer, and the color photoresist layer.

In an embodiment, the color photoresist layer is disposed between the common electrode layer and the second substrate layer.

In an embodiment, the color photoresist layer is disposed between the array switch layer and the pixel electrode layer.

In an embodiment, the color photoresist layer is disposed between the first substrate layer and the array switch layer.

In an embodiment, edges of the first substrate layer and the second substrate layer are sealed by using a conductive sealant, the first substrate layer is further provided with a first common electrode, one end of the conductive sealant is connected to the first common electrode, and the other end is connected to the common electrode layer.

Still another objective of this application is to provide a display panel, including a pixel arrangement, where the pixel arrangement includes:

a plurality of pixel cells arranged in an array, where each pixel cell includes four sub-pixels that are respectively a red sub-pixel, a green sub-pixel, a blue sub-pixel, and a white sub-pixel;

a plurality of scanning lines, where sub-pixels in a same row are connected to a same scanning line; and a plurality of data lines, where sub-pixels in a same column are connected to a same data line, where an arrangement manner of sub-pixels corresponding to an $N^{th}$ scanning line is red, green, blue, white, green, red, white, and blue, and an arrangement manner of sub-pixels corresponding to an $(N+1)^{th}$ scanning line is white, blue, red, green, blue, white, green, and red; and polarities of data signals of two neighboring sub-pixels corresponding to a same scanning line are opposite, and polarities of data signals of two neighboring sub-pixels with a same color that correspond to a same data line are opposite.

According to the pixel arrangement and the display panel that are provided in the embodiments of this application, layout of the sub-pixels is designed in the foregoing manner. Sub-pixels connected to eight sequential data lines are used as a repetition group, that is, color setting of an $N^{th}$ column of sub-pixels is the same as color setting of an $(N+8)^{th}$ column of sub-pixels. In one repetition group, polarities of data signals of sub-pixels with a same color that are connected to a same scanning line are opposite, so that when sub-pixels corresponding to a same polarity are lit up, a red sub-pixel, a green sub-pixel, a blue sub-pixel, and a white sub-pixel can be lit up together. When sub-pixels with a same color are lit up, a positive polarity and a negative polarity can coexist. In addition, a drive manner does not need to be improved or complexly designed, to effectively inhibit or avoid phenomena such as flicker, color cast, and cross-talk, and improve display effects.

BRIEF DESCRIPTION OF THE DRAWINGS

To describe the technical solutions in embodiments of this application more clearly, the accompanying drawings for illustrating the embodiments or the prior art are given briefly below. Apparently, the accompanying drawings are only for the exemplary purpose, and persons of ordinary skill in the art can derive other drawings from the accompanying drawings without creative efforts.

DETAILED DESCRIPTION

To make objectives, technical solutions and advantages of this application more understandable and comprehensible, this application is further described in detail below with reference to accompanying drawings and embodiments. It should be understood that the embodiments herein are provided for describing this application and not intended to limit this application.

It should be noted that when an element is referred to as being "fixed" to or "disposed" on another element, it can be directly fixed to or disposed on the other element or intervening elements may also be present. When an element is referred to as being "coupled" or "connected" to another element, it can be directly or indirectly coupled or connected to the other element. Orientation or position relationships indicated by the terms such as "on", "below", "left", and "right" are based on orientation or position relationships shown in the accompanying drawings, and are used only for ease of illustration description, rather than indicating or implying that the mentioned apparatus or component must have a particular orientation or must be constructed and operated in a particular orientation. Therefore, such terms should not be construed as limiting of this application. Persons of ordinary skill in the art can understand the specific meaning of these terms according to specific situations. The terms such as "first" and "second" are used only for the purpose of description, and should not be understood as indicating or implying the relative importance or implicitly specifying the number of the indicated technical features. Unless otherwise particularly defined, "a plurality of" means two or more than two.

The technical solutions of this application are described in detail below with reference to the accompanying drawings and embodiments.

Figure 1:
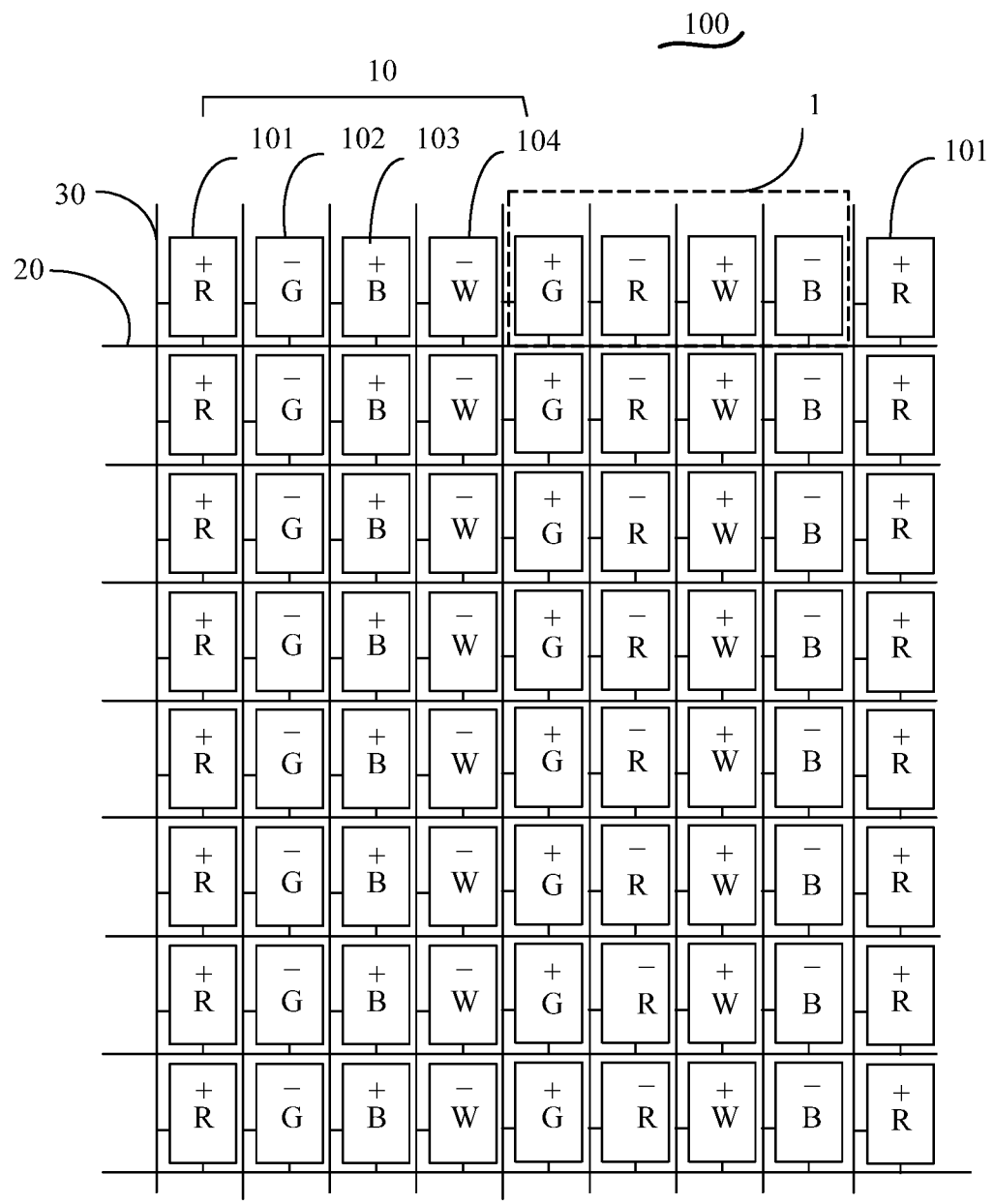
FIG. 1 is a schematic diagram of a pixel arrangement according to a first embodiment of this application.

Referring to FIG. 1, an embodiment of this application provides a pixel arrangement 100, applied to a display panel 200. The pixel arrangement includes a plurality of pixel cells 1 arranged in an array, and the pixel cell 1 is a pixel. Each pixel cell 1 includes four sub-pixels 10 that are respectively a red sub-pixel 101, a green sub-pixel 102, a blue sub-pixel 103, and a white sub-pixel 104. Sub-pixels 10 in a same row are connected to a same scanning line 20 by using corresponding sub-pixel electrodes, and sub-pixels 10 in a same column are connected to a same data line 30 by using corresponding sub-pixel electrodes. In the pixel arrangement, sub-pixels 10 connected to eight sequential data lines 30 is used as a repetition group, and repetition groups are sequentially arranged in a direction of the scanning line 20 to form the pixel arrangement of the entire display panel. Color setting of an $N^{th}$ column of sub-pixels 10 is the same as color setting of an (N+8) column of sub-pixels 10, and a data signal on an $N^{th}$ data line 30 is the same as a data signal on an $(N+8)^{th}$ data line 30. That "data signals are the same" means that at least polarities of the data signals are the same. Descriptions are provided with reference to FIG. 1. Polarities of data signals of the $1^{st}$ column of red sub-pixels 101 corresponding to the $1^{st}$ data line 30 are +, and polarities of data signals of the $9^{th}$ column of red sub-pixels 101 corresponding to the $9^{th}$ data line 30 are also +. It should be further noted that in a same column of sub-pixels 10, polarities of data signals of different sub-pixels 10 may be the same or may be different. However, it needs to be ensured that in the $N^{th}$ column, a distribution manner of polarities of data signals of the sub-pixels 10 is the same as a distribution manner of polarities of data signals of the sub-pixels 10 in the $(N+8)^{th}$ column. In addition, in one repetition group, polarities of data signals of sub-pixels 10 with a same color that are connected to a same scanning line 20 are opposite. That is, polarities of data signals of red sub-pixels 101 connected to the same scanning line 20 are opposite, polarities of data signals of red sub-pixels 102 connected to the same scanning line 20 are opposite, polarities of data signals of blue sub-pixels 103 connected to the same scanning line 20 are opposite, and polarities of data signals of white sub-pixels 104 connected to the same scanning line 20 are opposite. FIG. 1 to FIG. 6 are plan views of several embodiments of the pixel arrangement.

Sub-pixel layout of the pixel arrangement is designed in the foregoing manner, and the sub-pixels 10 connected to the eight sequential data lines 30 are used as the repletion unit. The data signal on the $N^{th}$ data line 30 is the same as the data signal on the $(N+8)^{th}$ data line 30. In one repetition group, the polarities of the data signals of the sub-pixels 10 having the same color that are connected to the same scanning line 20 are opposite, so that when sub-pixels 10 corresponding to a same polarity are lit up, the red sub-pixel 101, the green sub-pixel 102, the blue sub-pixel 103, and the white sub-pixel 104 can be lit up together. When sub-pixels 10 with a same color are lit up, a positive polarity and a negative polarity can coexist. In addition, a drive manner does not need to be improved or complexly designed, to effectively inhibit or avoid phenomena such as flicker, color cast, and cross-talk, and improve display effects.

Optionally, on a same scanning line 20, polarities of data signals of any neighboring sub-pixels may be different, to avoid a VCross-talk phenomenon.

Several specific embodiments are provided below.

Embodiment 1

Referring to FIG. 1, in this embodiment, polarities of data signals of a plurality of sub-pixels 10 corresponding to a same data line 30 are the same, and polarities of data signals on neighboring data lines 30 are opposite. That is, data signals of all sub-pixels 10 in each column have a same polarity, and are all positive or negative; and polarities of data signals in two neighboring columns are opposite. For any scanning line 20, polarities of data signals corresponding to sub-pixels 10 connected to the scanning line 20 are sequentially +, −, +, −, +, −, . . . .

Figure 2:
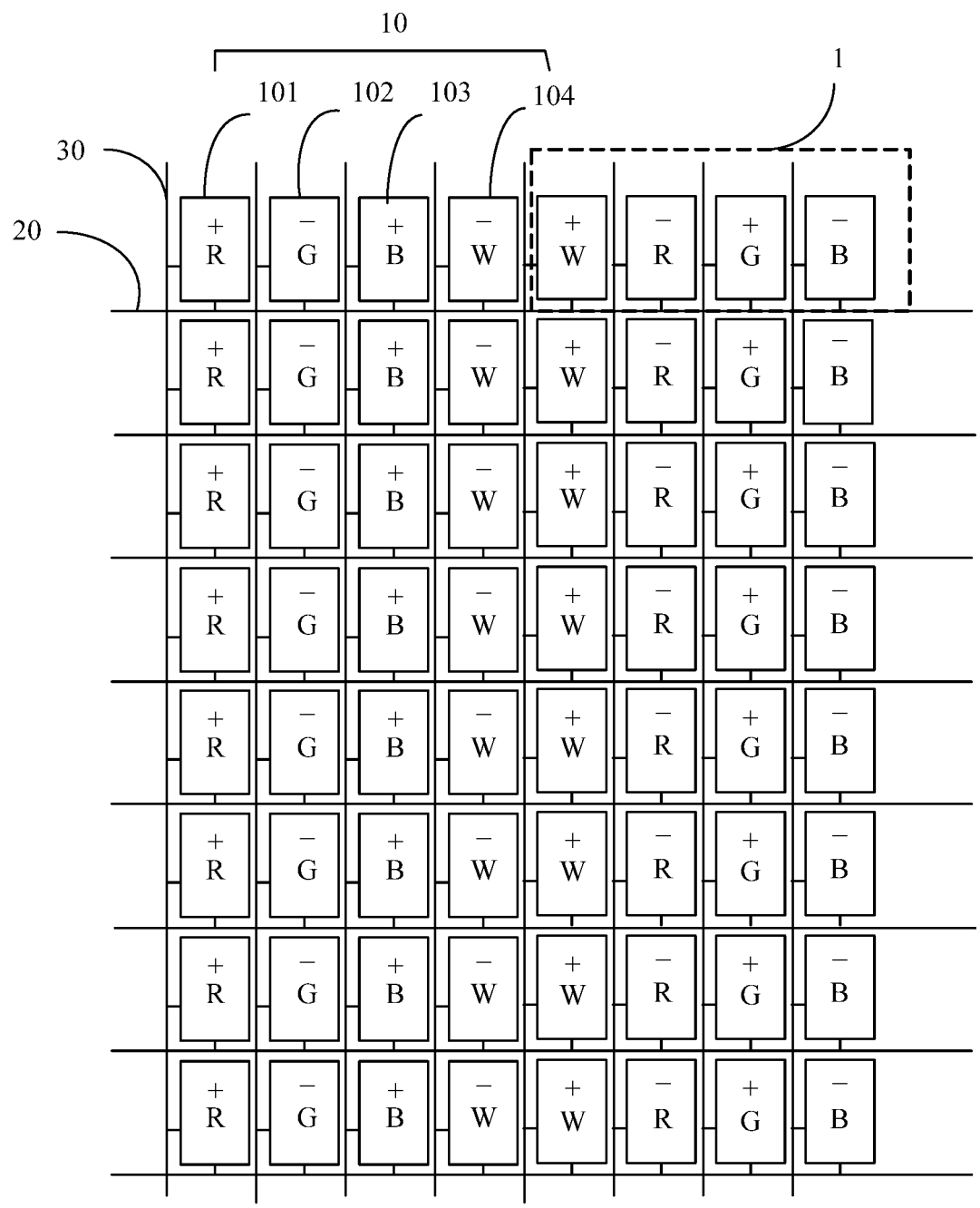
FIG. 2 is a schematic diagram of a pixel arrangement according to a second embodiment of this application.

In addition, sub-pixels 10 corresponding to each scanning line 20 have a same arrangement structure, and the sub-pixels 10 corresponding to the same data line 30 have a same color. That is, each row of sub-pixels 10 has a same color arrangement manner. As shown in FIG. 2, the $1^{st}$ row of sub-pixels 10 to the last row of sub-pixels 10 are all arranged in a sequence of R, G, B, W, G, R, W, and B.

It may be determined through analysis of the pixel arrangement that when sub-pixels 10 whose polarities are positive are lit up, a red sub-pixel 101, a green sub-pixel 102, a blue sub-pixel 103, and a white sub-pixel 104 can be lit up. When the red sub-pixel 101 is separately lit up, a positive polarity and a negative polarity coexist, and a voltage of a common electrode is not pulled up or pulled down. In addition, on any scanning line 20, polarities corresponding to any neighboring sub-pixels are different, and a cross-talk phenomenon is avoided. Similarly, when the green sub-pixel 102, the blue sub-pixel 103, and the white sub-pixel 104 are separately lit up, phenomena such as flicker, color cast, and VCross-talk can also be effectively inhibited or avoided.

Embodiment 2

Referring to FIG. 2, a similarity between this embodiment and Embodiment 1 is: polarities of data signals of a plurality of sub-pixels 10 corresponding to a same data line 30 are the same, and polarities of data signals on neighboring data lines 30 are opposite. That is, data signals of all sub-pixels 10 in each column have a same polarity, and are all positive or negative; and polarities of data signals in two neighboring columns are opposite. For any scanning line 20, polarities of data signals corresponding to sub-pixels 10 connected to the scanning line 20 are sequentially +, −, +, −, +, −, . . . .

A difference between this embodiment and Embodiment 1 is: an arrangement manner of sub-pixels 10 corresponding to each scanning line 20 is R, G, B, W, W, R, G, and B. Similarly, when sub-pixels 10 whose polarities are positive are lit up, a red sub-pixel 101, a green sub-pixel 102, a blue sub-pixel 103, and a white sub-pixel 104 can be lit up. When the red sub-pixel 101 is lit up, a positive polarity and a negative polarity coexist; and when the green sub-pixel 102, the blue sub-pixel 103, and the white sub-pixel 104 are separately lit up, the positive polarity and the negative polarity also coexist, so that phenomena such as flicker, color cast, and cross-talk can be effectively inhibited or avoided. In addition, on a same scanning line 20, polarities of any neighboring data lines 30 are different, and a VCross-talk phenomenon is avoided.

Embodiment 3

Figure 3:
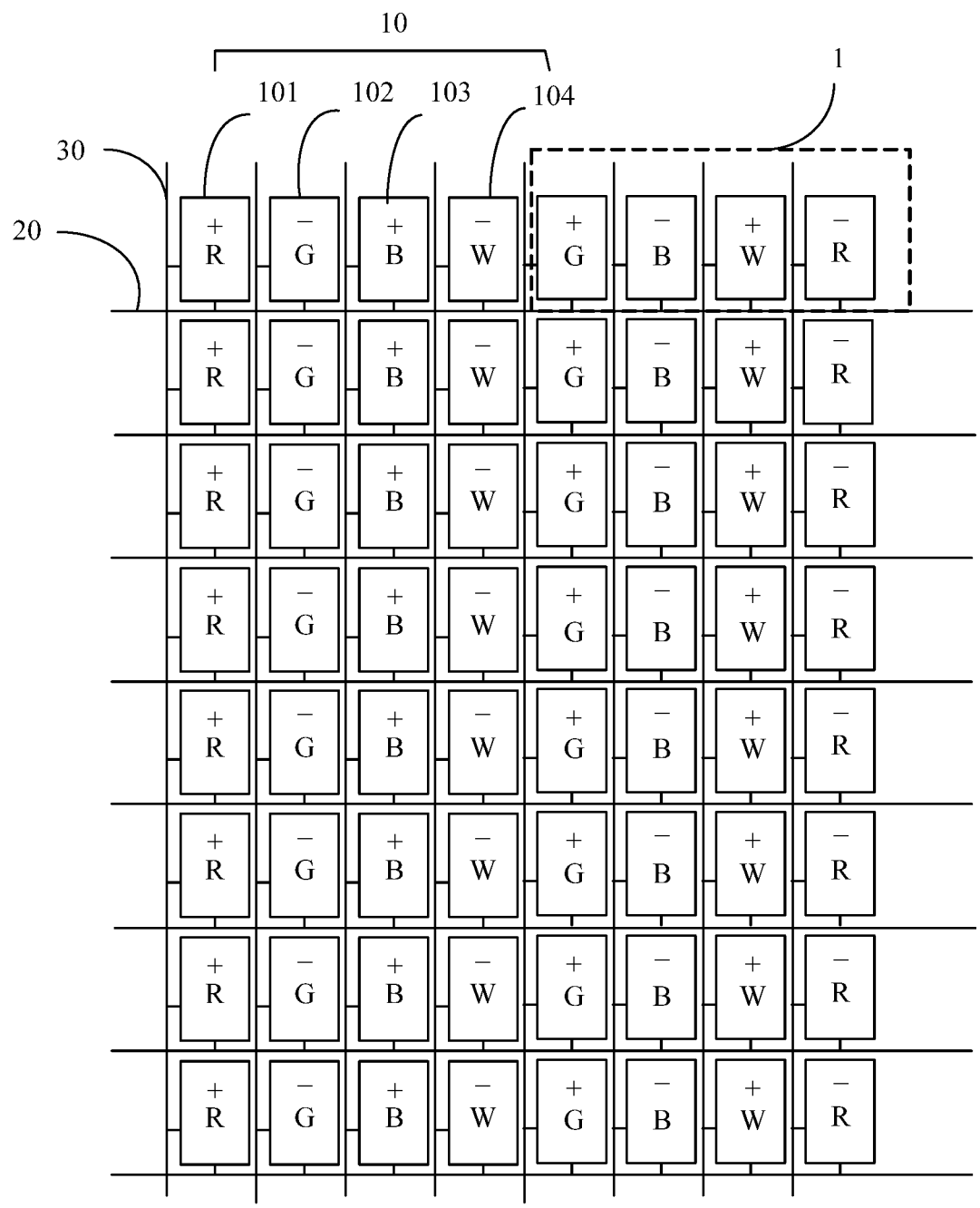
FIG. 3 is a schematic diagram of a pixel arrangement according to a third embodiment of this application.

Referring to FIG. 3, a similarity between this embodiment and Embodiment 1 is: polarities of data signals of a plurality of sub-pixels 10 corresponding to a same data line 30 are the same, and polarities of data signals on neighboring data lines 30 are opposite. That is, data signals of all sub-pixels 10 in each column have a same polarity, and are all positive or negative; and polarities of data signals in two neighboring columns are opposite. For any scanning line 20, polarities of data signals corresponding to sub-pixels 10 connected to the scanning line 20 are sequentially +, −, +, −, +, −, . . . .

A difference between this embodiment and Embodiment 1 is: an arrangement manner of sub-pixels 10 corresponding to each scanning line 20 is R, G, B, W, G, B, W, and R. Similarly, when sub-pixels 10 whose polarities are positive are lit up, a red sub-pixel 101, a green sub-pixel 102, a blue sub-pixel 103, and a white sub-pixel 104 can be lit up. When the red sub-pixel 101, the green sub-pixel 102, the blue sub-pixel 103, and the white sub-pixel 104 are separately lit up, a positive polarity and a negative polarity coexist, so that phenomena such as flicker, color cast, and cross-talk can be effectively inhibited or avoided. In addition, on a same scanning line 20, polarities of any neighboring data lines 30 are different, and a VCross-talk phenomenon is avoided.

Embodiment 4

Figure 4:
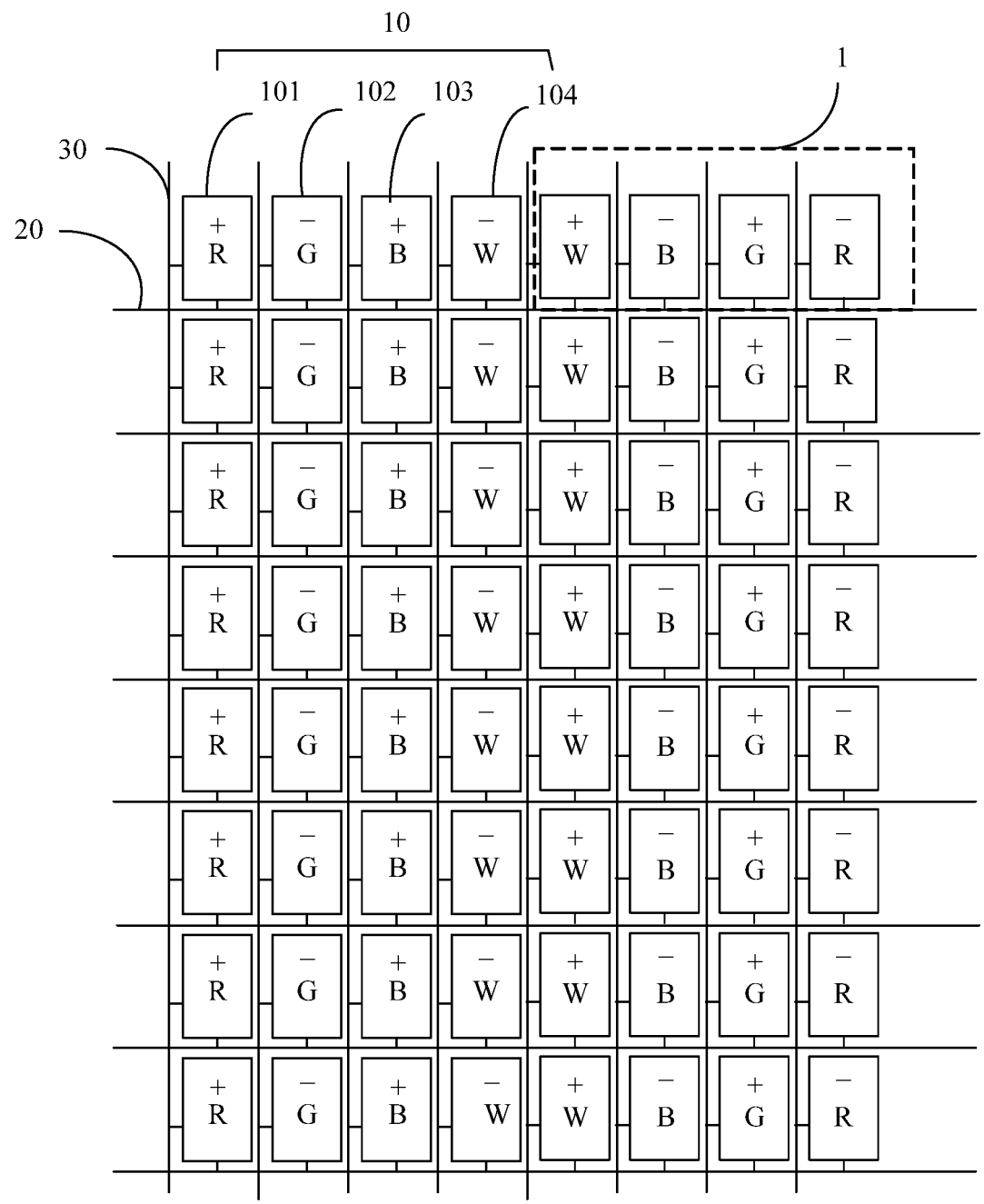
FIG. 4 is a schematic diagram of a pixel arrangement according to a fourth embodiment of this application.

Referring to FIG. 4, a similarity between this embodiment and Embodiment 1 is: polarities of data signals of a plurality of sub-pixels 10 corresponding to a same data line 30 are the same, and polarities of data signals on neighboring data lines 30 are opposite. That is, data signals of all sub-pixels 10 in each column have a same polarity, and polarities of data signals in two neighboring columns are opposite. For any scanning line 20, polarities of data signals corresponding to sub-pixels 10 connected to the scanning line 20 are sequentially +, −, +, −, +, −, . . . .

A difference between this embodiment and Embodiment 1 is: an arrangement manner of sub-pixels 10 corresponding to each scanning line 20 is R, G, B, W, W, B, G, and R. When sub-pixels 10 whose polarities are positive are lit up, a red sub-pixel 101, a green sub-pixel 102, a blue sub-pixel 103, and a white sub-pixel 104 can be lit up. When the red sub-pixel 101, the green sub-pixel 102, the blue sub-pixel 103, and the white sub-pixel 104 are separately lit up, a positive polarity and a negative polarity coexist. In addition, on a same scanning line 20, polarities of any neighboring data lines 30 are different, and a VCross-talk phenomenon is avoided.

Embodiment 5

Figure 5:
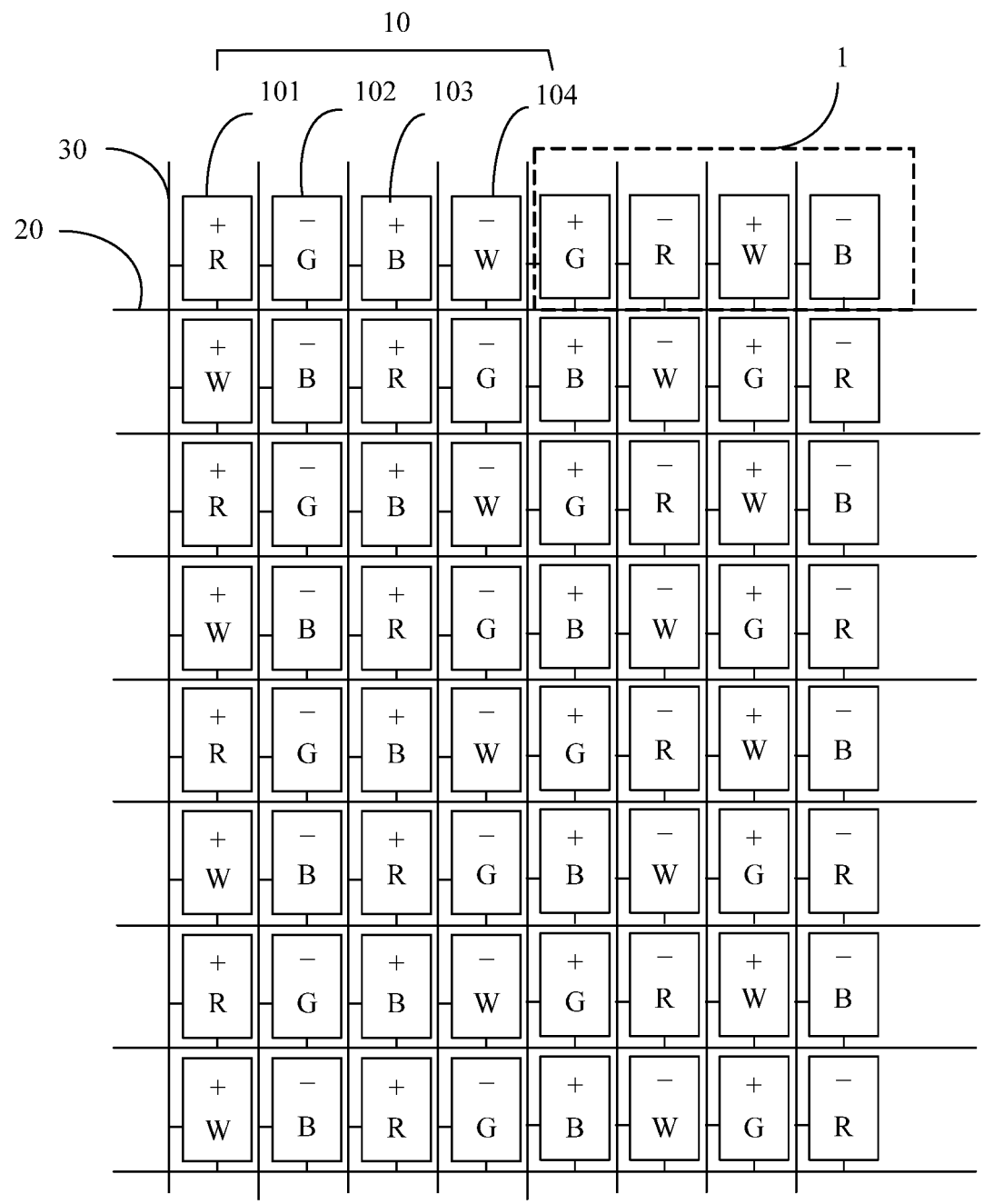
FIG. 5 is a schematic diagram of a pixel arrangement according to a fifth embodiment of this application.
Figure 7:
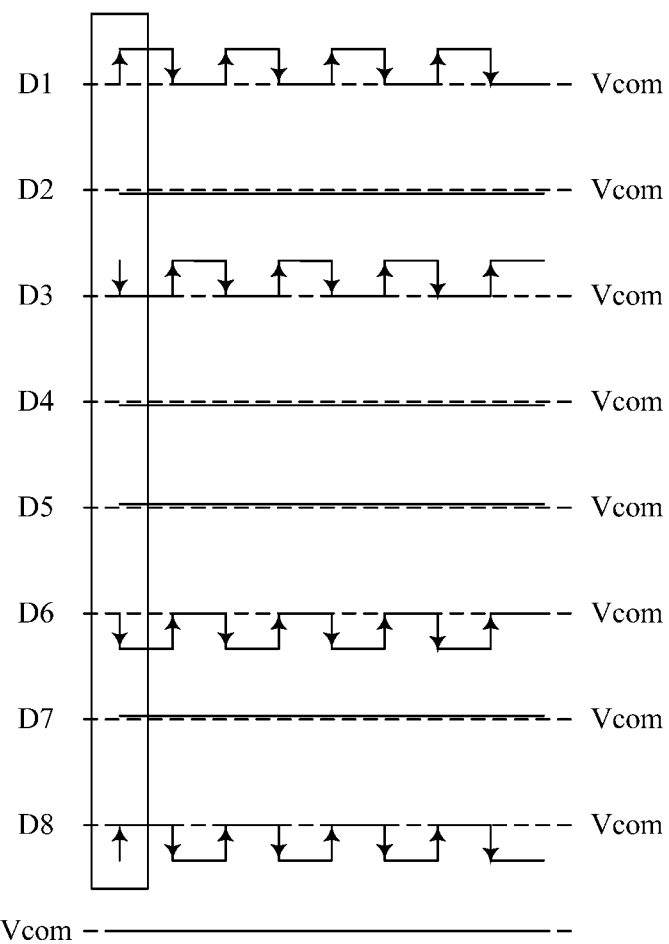
FIG. 7 is a waveform graph of a data signal when only a red sub-pixel in a pixel arrangement is lit up according to the fifth embodiment of this application.

Referring to FIG. 5 and FIG. 7, this embodiment is different from Embodiment 1 to Embodiment 4. Polarities of data signals of a plurality of sub-pixels 10 corresponding to a same data line 30 may be the same or may be different, and polarities of data signals on neighboring data lines 30 may also be the same or different. A feature of a pixel arrangement in this embodiment is: an arrangement structure of sub-pixels 10 corresponding to an $N^{th}$ scanning line 20 is the same as an arrangement structure of sub-pixels 10 corresponding to an $(N+2)^{th}$ scanning line 20, and sub-pixels 10 corresponding to a same data line 30 have a same color at intervals of one sub-pixel 10. That is, sub-pixels 10 in odd-numbered rows such as the $1^{st}$ row, the $3^{rd}$ row, and the $5^{th}$ row have a same arrangement structure, and sub-pixels 10 in even-numbered rows such as the $2^{nd}$ row, the $4^{th}$ row, and the $6^{th}$ row have a same arrangement structure.

Specifically, an arrangement manner of the sub-pixels 10 corresponding to the $N^{th}$ scanning line 20 (in an $N^{th}$ row) is R, G, B, W, G, R, W, and B, and an arrangement manner of sub-pixels 10 corresponding to an $(N+1)^{th}$ scanning line 20 is W, B, R, G, B, W, G, and R. An arrangement manner of the sub-pixels 10 corresponding to the $(N+2)^{th}$ scanning line 20 (in the $N^{th}$ row) is R, G, B, W, G, R, W, and B, and an arrangement manner of sub-pixels 10 corresponding to an $(N+3)^{th}$ scanning line 20 is W, B, R, G, B, W, G, and R. The rest can be deduced by analogy.

Based on the foregoing, the polarities of the data signals of the plurality of sub-pixels 10 corresponding to the same data line 30 (in a same column) are the same, and the polarities of the data signals on the neighboring data lines 30 are opposite. That is, polarities of a column of sub-pixels 10 are all positive or negative, and polarities of two neighboring columns of sub-pixels 10 are alternately positive and negative. Correspondingly, polarities of data signals of two neighboring sub-pixels 10 corresponding to a same scanning line 20 (in a same row) are opposite.

When the pixel arrangement is designed according to the foregoing structure, it may be determined that when sub-pixels 10 whose polarities are positive are lit up, a red sub-pixel 101, a green sub-pixel 102, a blue sub-pixel 103, and a white sub-pixel 104 can be lit up. Referring to a waveform of a data signal in FIG. 7 when the red sub-pixel 101 is separately lit up, pixel polarities of red sub-pixels on a same scanning line are opposite and can be balanced, so that a common electrode is not affected, to reduce a possibility of occurrence of flicker and HCross-talk. In addition, polarities of signals on two neighboring data lines are opposite, to further reduce VCross-talk, improve panel display quality, and improve a yield. In addition, when the green sub-pixel 102, the blue sub-pixel 103, and the white sub-pixel 104 are separately lit up, same effects can be achieved.

Embodiment 6

Figure 6:
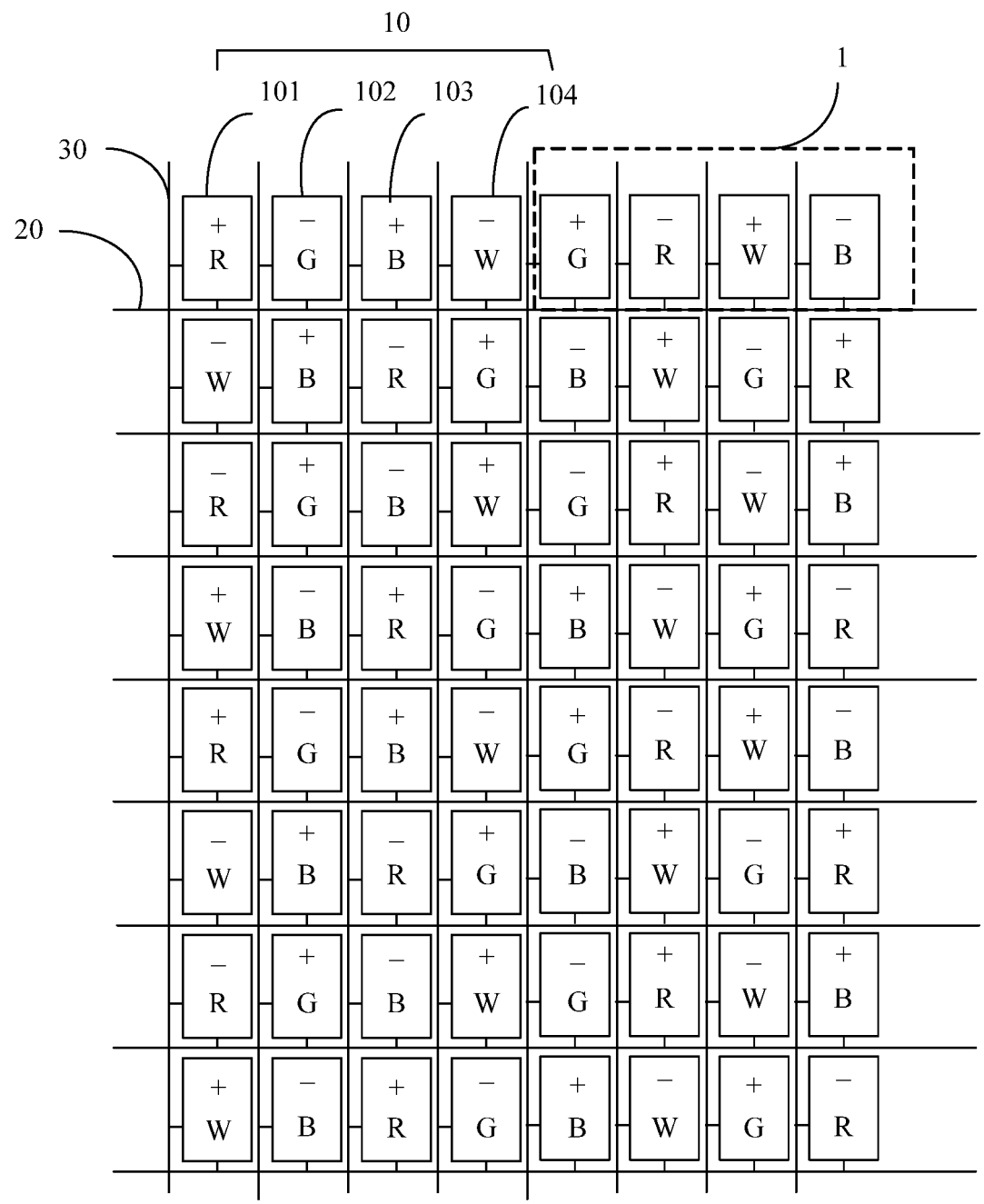
FIG. 6 is a schematic diagram of a pixel arrangement according to a sixth embodiment of this application.

Referring to FIG. 6, a similarity between this embodiment and Embodiment 5 is: an arrangement structure of sub-pixels 10 corresponding to an $N^{th}$ scanning line 20 is the same as an arrangement structure of sub-pixels 10 corresponding to an $(N+2)^{th}$ scanning line 20, and sub-pixels 10 corresponding to a same data line 30 have a same color at intervals of one sub-pixel 10. That is, sub-pixels 10 in odd-numbered rows such as the $1^{st}$ row, the $3^{rd}$ row, and the $5^{th}$ row have a same arrangement structure, and sub-pixels 10 in even-numbered rows such as the $2^{nd}$ row, the $4^{th}$ row, and the $6^{th}$ row have a same arrangement structure.

Specifically, an arrangement manner of the sub-pixels 10 corresponding to the $N^{th}$ scanning line 20 (in an $N^{th}$ row) is R, G, B, W, G, R, W, and B, and an arrangement manner of sub-pixels 10 corresponding to an $(N+1)^{th}$ scanning line 20 is W, B, R, G, B, W, G, and R. An arrangement manner of the sub-pixels 10 corresponding to the $(N+2)^{th}$ scanning line 20 (in the $N^{th}$ row) is R, G, B, W, G, R, W, and B, and an arrangement manner of sub-pixels 10 corresponding to an $(N+3)^{th}$ scanning line 20 is W, B, R, G, B, W, G, and R. The rest can be deduced by analogy.

Polarities of data signals of two neighboring sub-pixels 10 corresponding to a same scanning line 20 (in a same row) are still opposite. However, a difference between this embodiment and Embodiment 5 is: polarities of sub-pixels 10 on a same data line 30 (in a same column) are different. In a same column of sub-pixels 10, polarities of data signals of two neighboring sub-pixels 10 with a same color are opposite. Arrangement structures of sub-pixels 10 in neighboring rows are different, and arrangement structures of sub-pixels 10 spaced by one row are the same. Therefore, in the same column of sub-pixels 10, colors of sub-pixels 10 spaced by one sub-pixel 10 are the same. In this embodiment, the neighboring sub-pixels 10 in the same column that have the same color are two sub-pixels 10 spaced by one sub-pixel 10, and polarities of the two sub-pixels 10 are opposite and are alternately positive and negative.

Specifically, referring to FIG. 6, in each column of sub-pixels 10, polarities are sequentially +, +, −, −, +, +, −, and −. In addition, on a same scanning line 20, polarities of any neighboring data lines 30 are different.

When a pixel arrangement is designed according to the foregoing structure, it may be determined that when sub-pixels 10 whose polarities are positive are lit up, a red sub-pixel 101, a green sub-pixel 102, a blue sub-pixel 103, and a white sub-pixel 104 can be lit up. When the red sub-pixel 101, the green sub-pixel 102, the blue sub-pixel 103, and the white sub-pixel 104 are separately lit up, a positive polarity and a negative polarity coexist. Pixel polarities of sub-pixels with a same color on a same scanning line are opposite and can be balanced, so that a common electrode is not affected, to reduce a possibility of occurrence of flicker and HCross-talk. In addition, polarities of signals on two neighboring data lines are opposite, to reduce VCross-talk, improve panel display quality, and improve a yield.

The foregoing embodiments are merely optional implementations of the pixel arrangement in this application, and the phenomena such as flicker, color cast, and cross-talk can be avoided by using the foregoing pixel arrangement. The pixel arrangement is applicable to a display panel. Therefore, a display panel including the foregoing pixel arrangement and a display including the display panel also fall within the protection scope of this application.

Figure 8:
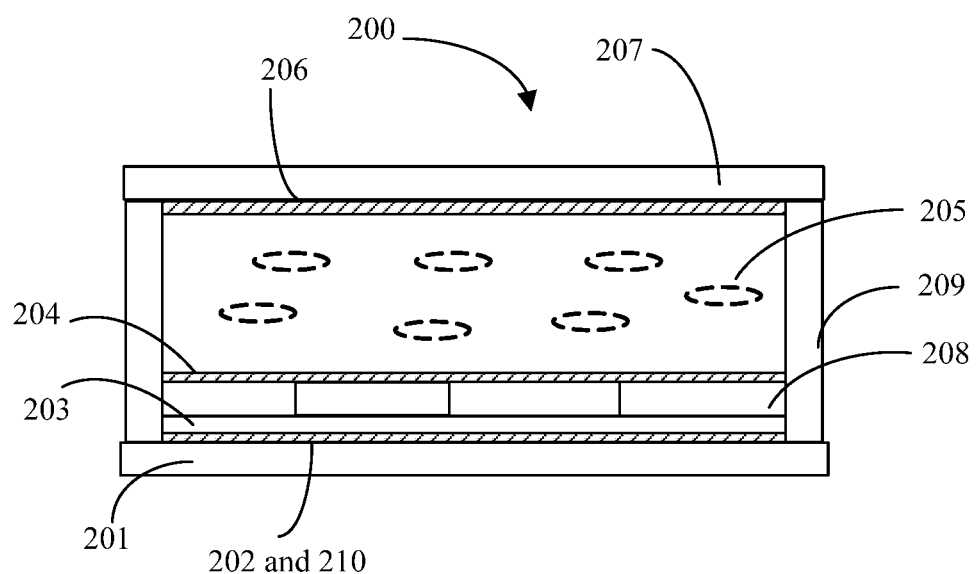
FIG. 8 is a schematic structural diagram of a display panel according to an embodiment of this application.

Referring to FIG. 8, the display panel 200 includes a first substrate layer 201, a metal conductor layer 202, an array switch layer 203, a pixel electrode layer 204, an optical conducting layer 205, a common electrode layer 206, and a second substrate layer 207 that are sequentially disposed and a color photoresist layer 208 disposed between the first substrate layer 201 and the second substrate layer 207, and the pixel arrangement 100 includes at least the array switch layer 203, the metal conductor layer 202, the pixel electrode layer 204, the optical conducting layer 205, the common electrode layer 206, and the color photoresist layer 207. Specifically, the first substrate layer 201 and the second substrate layer 207 may be glass parts, the metal conductor layer 202 includes at least the scanning line 20 and the data line 30, the array switch layer 203 includes a plurality of switches formed in an array on the first substrate layer 201, the pixel electrode layer 204 includes a plurality of pixel electrodes arranged in an array, and one switch is connected to one pixel electrode. The optical conducting layer 205 may be a liquid crystal layer, and the common electrode layer 206 is disposed on a side of the second substrate layer 207 facing the optical conducting layer 205. For ease of description, it may be considered that a plurality of common electrodes arranged in an array is formed and connected to each other. One switch, one pixel electrode connected to the switch, one common electrode directly facing the pixel electrode, and a part of the optical conducting layer that is located between the pixel electrode and the common electrode form one sub-pixel 10.

In an embodiment, the color photoresist layer 208 is disposed between the common electrode layer 206 and the second substrate layer 207.

In another embodiment, the color photoresist layer 208 is disposed between the array switch layer 203 and the pixel electrode layer 204.

In still another embodiment, the color photoresist layer 208 is disposed between the first substrate layer 201 and the array switch layer 203.

In another embodiment, edges of the first substrate layer 201 and the second substrate layer 207 are sealed by using a conductive sealant 209, and the first substrate layer 201 is further provided with a first common electrode 210. One end of the conductive sealant 209 is connected to the first common electrode 210, and the other end is connected to the common electrode layer 206. The first common electrode 210 and the common electrode layer 206 form a storage capacitance.

The above descriptions are merely optional embodiments of this application, and are not intended to limit this application. It should be understood by persons skilled in the art that various modifications and variations can be made to this application. Any modification, equivalent replacement, or improvement made without departing from the spirit and principle of this application shall fall within the scope as defined by the appended claims.

What is claimed is:

1. A pixel arrangement, comprising:
   a plurality of pixel cells arranged in an array, wherein the respective pixel cell comprises four sub-pixels that are respectively a red sub-pixel, a green sub-pixel, a blue sub-pixel and a white sub-pixel;
   a plurality of scanning lines, wherein sub-pixels in a same row are connected to a same scanning line; and
   a plurality of data lines, wherein sub-pixels in a same column are connected to a same data line;
   wherein in the pixel arrangement, sub-pixels connected to eight sequential data lines are arranged as a repetition group, wherein the polarity of a data signal of an $N^{th}$ data line is the same as the polarity of a data signal of an $(N+8)^{th}$ data line, wherein N is an integer greater than zero, and in one repetition group, polarities of data signals of sub-pixels with a same color that are connected to a same scanning line are opposite; and
   wherein an arrangement structure of sub-pixels corresponding to an $N^{th}$ scanning line is the same as an arrangement structure of sub-pixels corresponding to an $(N+2)^{th}$ scanning line, and sub-pixels corresponding to a same data line have a same color at intervals of one sub-pixel and polarities of data signals of two neighboring sub-pixels corresponding to a same scanning line are opposite, and polarities of data, signals of two neighboring sub-pixels with a same color that correspond to the same data line are opposite.

2. The pixel arrangement according to claim 1, wherein polarities of data signals of a plurality of sub-pixels corresponding to a same data line are the same, and polarities of data signals on neighboring data lines are opposite.

3. The pixel arrangement according to claim 2, wherein sub-pixels corresponding to each scanning line have a same arrangement structure, and the sub-pixels corresponding to the same data line have a same color.

4. The pixel arrangement according to claim 3, wherein an arrangement manner of the sub-pixels corresponding to each scanning line is red, green, blue, white, green, red, white, and blue.

5. The pixel arrangement according to claim 3, wherein an arrangement manner of the sub-pixels corresponding to each scanning line is red, green, blue, white, white, red, green, and blue.

6. The pixel arrangement according to claim 3, wherein an arrangement manner of the sub-pixels corresponding to each scanning line is red, green, blue, white, green, blue, white, and red.

7. The pixel arrangement according to claim 3, wherein an arrangement manner of the sub-pixels corresponding to each scanning line is red, green, blue, white, white, blue, green, and red.

8. The pixel arrangement according to claim 1, wherein an arrangement manner of the sub-pixels corresponding to the $N^{th}$ scanning line is red, green, blue, white, green, red, white, and blue, and an arrangement manner of sub-pixels corresponding to an $(N+1)^{th}$ scanning line is white, blue, red, green, blue, white, green, and red.

9. The pixel arrangement according to claim 8, wherein polarities of data signals of a plurality of sub-pixels corresponding to the same data line are the same, and polarities of data signals on neighboring data lines are opposite.

10. A display panel, comprising:
a pixel arrangement, wherein the pixel arrangement comprises:
a plurality of pixel cells arranged in an array, wherein each pixel cell comprises four sub-pixels that are respectively a red sub-pixel, a green sub-pixel, a blue sub-pixel, and a white sub-pixel;
a plurality of scanning lines, wherein sub-pixels in a same row are connected to a same scanning line; and
a plurality of data lines, wherein sub-pixels in a same column are connected to a same data line, wherein
in the pixel arrangement, sub-pixels connected to eight sequential data lines are arranged as a repetition group, wherein the polarity of a data, signal of an $N^{th}$ data line is the same as the polarity of a data signal of an $(N+8)^{th}$ data line, N is an integer greater than zero, and in one repetition group, polarities of data signals of sub-pixels with a same color that are connected to a same scanning line are opposite; and
wherein the display panel further comprises a first substrate layer, a metal conductor layer, an array switch layer, a pixel electrode layer, an optical conducting layer, a common electrode layer, and a second substrate layer that are sequentially disposed and a color photoresist layer disposed between the first substrate layer and the second substrate layer, and the pixel arrangement comprises at least the array switch layer, the metal conductor layer, the pixel electrode layer, the optical conducting layer, the common electrode layer, and the color photoresist layer.

11. The display panel according to claim 10, wherein the color photoresist layer is disposed between the common electrode layer and the second substrate layer.

12. The display panel according to claim 10, wherein the color photoresist layer is disposed between the array switch layer and the pixel electrode layer.

13. The display panel according to claim 10, wherein the color photoresist layer is disposed between the first substrate layer and tire array switch layer.

14. The display panel according to claim 10, wherein edges of the first substrate layer and the second substrate layer are sealed by using a conductive sealant, the first substrate layer is further provided with a first common electrode one end of the conductive sealant is connected to the first common electrode, and the other end is connected to the common electrode layer.

15. A display panel, comprising a pixel arrangement, wherein the pixel arrangement comprises:
a plurality of pixel cells arranged in an array, wherein each pixel cell comprises four sub-pixels that are respectively a red sub-pixel, a green sub-pixel, a blue sub-pixel, and a white sub-pixel;
a plurality of scanning lines, wherein sub-pixels in a same row are connected to a same scanning line; and
a plurality of data lines, wherein sub-pixels in a same column are connected to a same data line, wherein
an arrangement manner of sub-pixels corresponding to an $N^{th}$ scanning line is red, green, blue, white, green, red, white, and blue, and an arrangement manner of sub-pixels corresponding to an $(N+1)^{th}$ scanning line is white, blue, red, green, blue, white, green, and red; and polarities of data signals of two neighboring sub-pixels corresponding to a same scanning line are opposite, and polarities of data signals of two neighboring sub-pixels with a same color that correspond to a same data line are opposite; and
wherein the display panel further comprises a first substrate layer, a metal conductor layer, an array switch layer, a pixel electrode layer, an optical conducting layer, a common electrode layer, and a second substrate layer that are sequentially disposed and a color photoresist layer disposed between the first substrate layer and the second substrate layer, and the pixel arrangement comprises at least the array switch layer, the metal conductor layer, the pixel electrode layer, the optical conducting layer, the common electrode layer, and the color photoresist layer.

\* \* \* \* \*